United States Patent
Wu et al.

(10) Patent No.: US 11,015,914 B2
(45) Date of Patent: May 25, 2021

(54) CAPACITIVE IMAGE SENSING DEVICE AND CAPACITIVE IMAGE SENSING METHOD

(71) Applicant: Novatek Microelectronics Corp., Hsinchu (TW)

(72) Inventors: Chen-Tsung Wu, Kaohsiung (TW); Ji-Ting Chen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 233 days.

(21) Appl. No.: 16/252,739

(22) Filed: Jan. 21, 2019

(65) Prior Publication Data
US 2020/0232780 A1    Jul. 23, 2020

(51) Int. Cl.
*G01B 7/287*     (2006.01)
*G06K 9/00*      (2006.01)

(52) U.S. Cl.
CPC .......... *G01B 7/287* (2013.01); *G06K 9/0002* (2013.01)

(58) Field of Classification Search
CPC ... G01B 7/287; G06K 9/0002; G06K 9/00013
USPC ............. 324/658, 671, 686, 754.28
See application file for complete search history.

(56) References Cited

U.S. PATENT DOCUMENTS

| | | | | |
|---|---|---|---|---|
| 6,714,666 B1* | 3/2004 | Morimura | ........... | G06K 9/0002 340/5.52 |
| 7,075,316 B2* | 7/2006 | Umeda | ............. | G01R 27/2605 324/658 |
| 7,102,364 B2* | 9/2006 | Umeda | ................ | G06K 9/0002 324/658 |
| 7,864,992 B2* | 1/2011 | Riedijk | ................ | G06K 9/0002 382/124 |
| 8,283,934 B2* | 10/2012 | Nishizono | ............ | H03K 17/962 324/658 |
| 8,888,004 B2* | 11/2014 | Setlak | .................. | G06K 9/0002 235/439 |
| 9,094,628 B2* | 7/2015 | Williams | ............. | H04N 5/3355 |
| 9,157,945 B2* | 10/2015 | Kraver | ................... | G01C 19/00 |
| 9,164,620 B2* | 10/2015 | Hotelling | ............ | G06F 3/04166 |

(Continued)

OTHER PUBLICATIONS

Karki, James. Fully Differential Amplifiers Remove Noise From Common-Mode Signals. edn.com, Nov. 9, 2000. (Year: 2000).*

(Continued)

*Primary Examiner* — Patrick Assouad
*Assistant Examiner* — Sean Curtis
(74) *Attorney, Agent, or Firm* — JCIPRNET

(57) ABSTRACT

A capacitive image sensing device and a capacitive image sensing method are provided. The capacitive image sensing device includes a sensor array, a first charge amplifier, a second charge amplifier, a differential amplifier and a first switching circuit. The sensor array includes a plurality of sensing electrodes and a first reference sensing electrode. An input terminal of the first charge amplifier is coupled to one of the sensing electrodes. A first input terminal of the differential amplifier is selectively coupled to an output terminal of the first charge amplifier. A second input terminal of the differential amplifier is coupled to an output terminal of the second charge amplifier. The first switching circuit is configured to selectively electrically connect and disconnect the first reference sensing electrode and the input terminal of the second charge amplifier.

12 Claims, 9 Drawing Sheets

(56) References Cited

U.S. PATENT DOCUMENTS

| | | | | |
|---|---|---|---|---|
| 9,188,778 | B2* | 11/2015 | Gotoh | G02F 1/133512 |
| 9,395,850 | B2* | 7/2016 | Mamba | G06F 3/0446 |
| 9,507,148 | B2* | 11/2016 | Gotoh | G02F 1/134309 |
| 9,684,812 | B2* | 6/2017 | Riedijk | G06K 9/0002 |
| 9,772,370 | B2* | 9/2017 | Murashima | G01P 15/125 |
| 9,774,794 | B2* | 9/2017 | Sakino | G01T 1/247 |
| 9,927,924 | B2* | 3/2018 | Staton | G06F 3/04182 |
| 10,067,156 | B2* | 9/2018 | Yonezawa | G01P 15/0802 |
| 10,162,995 | B2* | 12/2018 | Lin | G06K 9/0002 |
| 10,191,588 | B2* | 1/2019 | Mamba | G06F 3/0418 |
| 10,216,974 | B2* | 2/2019 | Lin | G06K 9/0002 |
| 10,346,665 | B2* | 7/2019 | Lin | G06K 9/0002 |
| 10,474,291 | B2* | 11/2019 | Lu | G06F 3/04166 |
| 10,706,250 | B2* | 7/2020 | Chen | G06K 9/0008 |
| 2005/0073324 | A1* | 4/2005 | Umeda | G11C 27/026 |
| | | | | 324/662 |
| 2005/0122785 | A1* | 6/2005 | Umeda | G06F 3/04182 |
| | | | | 365/187 |
| 2005/0253598 | A1* | 11/2005 | Kawahata | G06K 9/0002 |
| | | | | 324/671 |
| 2014/0022475 | A1* | 1/2014 | Gotoh | G02F 1/133512 |
| | | | | 349/33 |
| 2014/0239189 | A1* | 8/2014 | Sakino | G01T 1/247 |
| | | | | 250/394 |
| 2014/0305206 | A1* | 10/2014 | Maki | G01C 19/5726 |
| | | | | 73/504.12 |
| 2015/0061702 | A1* | 3/2015 | Kraver | G01D 5/24 |
| | | | | 324/686 |
| 2015/0253926 | A1* | 9/2015 | Ota | G06F 3/0412 |
| | | | | 345/174 |
| 2015/0276790 | A1* | 10/2015 | Yonezawa | G01P 15/18 |
| | | | | 73/514.32 |
| 2015/0276853 | A1* | 10/2015 | Murashima | G01P 15/125 |
| | | | | 324/537 |
| 2015/0310248 | A1* | 10/2015 | Riedijk | G01R 27/26 |
| | | | | 382/124 |
| 2016/0041385 | A1* | 2/2016 | Gotoh | G02B 30/24 |
| | | | | 349/33 |
| 2016/0117023 | A1* | 4/2016 | Hotelling | G02F 1/133528 |
| | | | | 345/174 |
| 2016/0134824 | A1* | 5/2016 | Gomi | H04N 5/378 |
| | | | | 348/76 |
| 2016/0180138 | A1* | 6/2016 | Riedijk | G06K 9/0002 |
| | | | | 324/686 |
| 2016/0227142 | A1* | 8/2016 | Lin | G06K 9/00013 |
| 2016/0313862 | A1* | 10/2016 | Mamba | G06F 3/0412 |
| 2018/0074004 | A1* | 3/2018 | Lin | G01N 27/228 |
| 2018/0124347 | A1* | 5/2018 | Gomi | H04N 5/379 |
| 2018/0181258 | A1* | 6/2018 | Lu | G06F 3/044 |
| 2018/0300520 | A1* | 10/2018 | Lin | G06K 9/0002 |
| 2018/0349662 | A1* | 12/2018 | Lin | A61B 5/1172 |
| 2018/0349664 | A1* | 12/2018 | Lin | G06K 9/0002 |
| 2018/0349666 | A1* | 12/2018 | Chen | H03F 3/45 |
| 2019/0212873 | A1* | 7/2019 | Huang | G06F 3/044 |
| 2019/0251323 | A1* | 8/2019 | Zhu | G01D 5/24 |
| 2020/0232780 | A1* | 7/2020 | Wu | G06K 9/0002 |

OTHER PUBLICATIONS

Newnespress, Fully Differential Op Amps—Chapter 11. pp. 147-161. www.newnespress.com, Apr. 22, 2009. (Year: 2009).*

* cited by examiner

//CAPACITIVE IMAGE SENSING DEVICE AND CAPACITIVE IMAGE SENSING METHOD

BACKGROUND

Field of the Invention

The invention relates to an image sensing device and more particularly to a capacitive image sensing device and a capacitive image sensing method.

Description of Related Art

An analog front end (AFE) circuit array is usually used to read a sensing result of a capacitive image sensor array in a capacitive image sensing device (e.g., a fingerprint sensing device) technical field. The capacitive image sensing device includes a sensor array consisting of sensing electrodes carrying charge of finger capacitance, a readout circuit that converts the charge into sensing signals, and an analog-to-digital converter that converts the sensing signals to digital signals with respect to a fingerprint image. However, the general readout circuits may likely be affected by a system voltage noise (which is also referred to as power noise), which results in incorrect sensing signal being captured.

SUMMARY

The invention provides a capacitive image sensing device and a capacitive image sensing method capable of eliminating interference from the power noise.

According to an embodiment of the invention, a capacitive image sensing device including a sensor array, a first charge amplifier, a second charge amplifier, a differential amplifier and a first switching circuit is provided. The sensor array includes a plurality of sensing electrodes and a first reference sensing electrode. An input terminal of the first charge amplifier is coupled to one of the sensing electrodes. The differential amplifier has a first input terminal, a second input terminal and a differential output terminal pair. The first input terminal of the differential amplifier is selectively coupled to an output terminal of the first charge amplifier. The second input terminal of the differential amplifier is coupled to an output terminal of the second charge amplifier. The first switching circuit is coupled between the first reference sensing electrode and an input terminal of the second charge amplifier. The first switching circuit is configured to selectively electrically connect and disconnect the first reference sensing electrode and the input terminal of the second charge amplifier.

According to an embodiment of the invention, a capacitive image sensing method for sensing an image by a sensor array is provided. The sensor array includes a plurality of sensing electrodes and a reference sensing electrode group. The reference sensing electrode group is located in a central region of the sensor array. The capacitive image sensing method includes: receiving a plurality of sensing signals with respect to a first row of sensing electrodes and a second row of sensing electrodes, wherein the first row of sensing electrodes and the second row of sensing electrodes are parts of the plurality of sensing electrodes and are located adjacent to the reference sensing electrode group; determining whether the sensor array is heavily pressed based on the sensing signals; electrically disconnecting a first number of reference sensing electrodes in the reference sensing electrode group from corresponding charge amplifiers and electrically connecting in parallel a second number of reference sensing electrodes in the reference sensing electrode group in response to the determination that the senor array is heavily pressed; and generating an image by using a reference voltage signal received from the reference sensing electrodes connected in parallel.

To sum up, two charge amplifiers with similar structure are used in the capacitive image sensing device and the capacitive image sensing method of the embodiments of the invention. The first charge amplifier is configured to receive a sensing result corresponding to one of the sensing electrodes in the sensor array and provide a sensing signal to the first input terminal of the differential amplifier. The second capacitor is configured to provide the reference voltage signal to the second input terminal of the second charge amplifier. With the symmetrical readout circuit structure, the capacitive image sensing device can eliminate the interference from the power noise.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
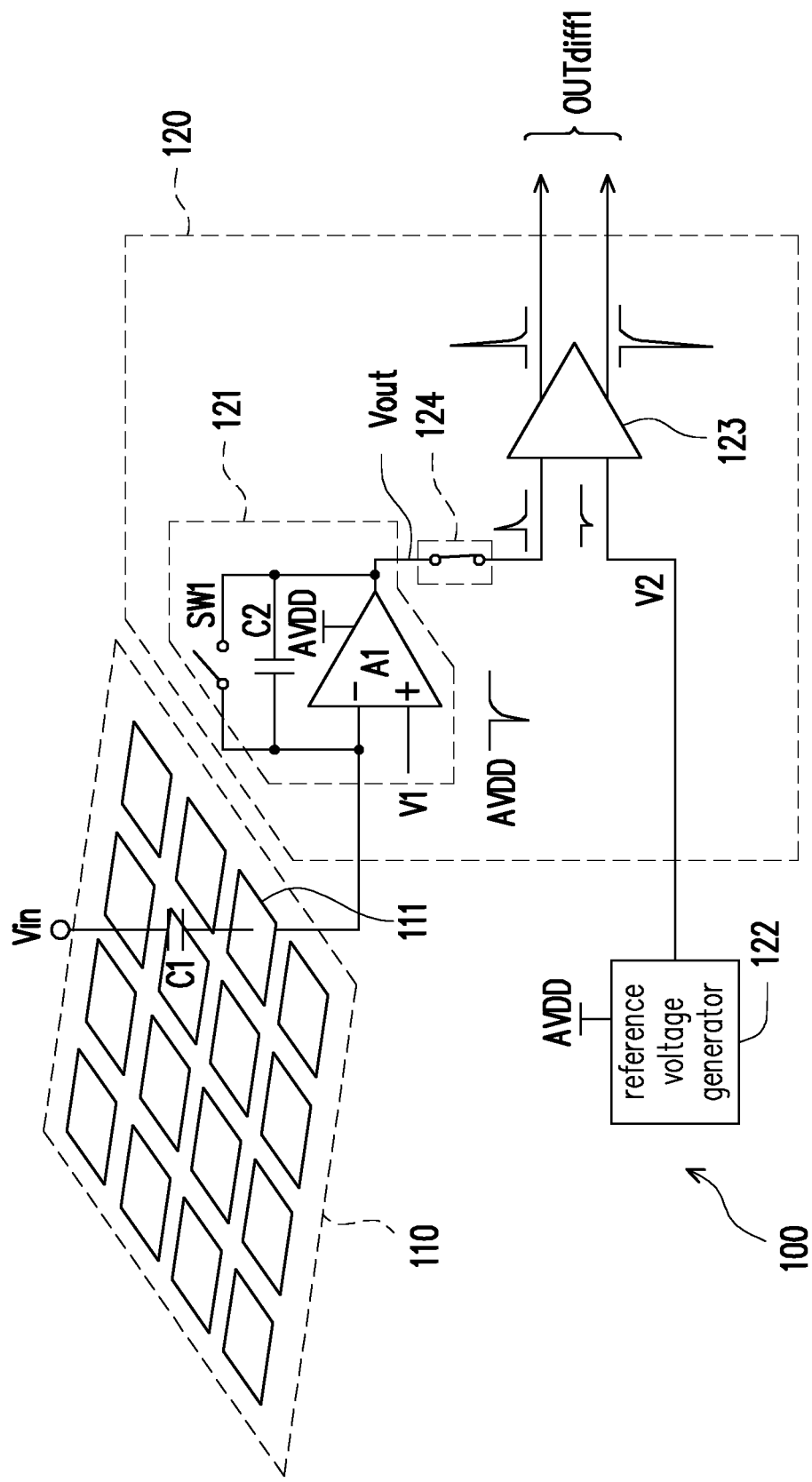
FIG. 1 is a schematic circuit block diagram illustrating a capacitive image sensing device.

The term "couple (or connect)" herein (including the claims) are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/notations with the same reference numerals in different embodiments may be referenced to the related description.

FIG. 1 is a schematic circuit block diagram illustrating a capacitive image sensing device 100. The capacitive image sensing device 100 includes a sensor array 110 and a readout circuit 120. The sensor array 110 includes a plurality of sensing electrodes. The readout circuit 120 includes a plurality of charge amplifiers 121 respectively corresponding to the sensing electrodes and a single-to-differential amplifier (which is referred to as a differential amplifier hereinafter) 123. For the illustrative convenience, only one charge amplifier 121 is shown in FIG. 1. Each of the sensing electrodes is electrically coupled to an input terminal of a corresponding charge amplifier 121. For instance, a sensing electrode 111 illustrated in FIG. 1 is electrically coupled to a corresponding charge amplifier 121. In some embodiments, the readout circuit 120 may be implemented in an integrated circuit, and the sensor array 110 may be implemented as another integrated circuit. In some other embodiments, the readout circuit 120 and the sensor array 110 may be integrated in one integrated circuit.

The charge amplifier 121 includes an operational amplifier A1, a feedback capacitor C2 and a reset switch SW1. The operational amplifier A1 has an inverting input terminal, a non-inverting input terminal and an output terminal. The inverting input terminal of the operational amplifier A1 is employed as an input terminal of the charge amplifier 121. The non-inverting input terminal of the operational amplifier A1 is coupled to a reference voltage V1. The output terminal of the operational amplifier A1 is coupled to a first input terminal of the differential amplifier 123. The feedback capacitor C2 is coupled between the inverting input terminal of the operational amplifier A1 and the output terminal of the operational amplifier A1. The reset switch SW1 is coupled between the inverting input terminal of the operational amplifier A1 and the output terminal of the operational amplifier A1, for discharging the feedback capacitor C2. The reset switch SW1 is turn off during the charge amplifier 121 is measuring charge carried by the sensing electrode 111.

The charge amplifier 121 is configured to receive an input voltage signal Vin that is a signal on a finger which touches the capacitive image sensing device 100, and to amplify the input voltage signal Vin to generate an output voltage signal Vout. The input voltage signal Vin may be generated when a periodic driving signal or a constant voltage is coupled to the finger through a conducting element such as a metal ring (bezel) of the capacitive image sensing device 100. The input voltage signal Vin is taken as a sensing result corresponding to the sensing electrode 111 and is associated with charges of a capacitance C1 formed between the finger and the sensing electrode 111. More precisely, the capacitance C1 is formed between a fingerprint ridge or a fingerprint valley and the sensing electrode 111. The output voltage signal Vout is taken as a sensing signal output by the charge amplifier 121. An amplification ratio of the charge amplifier 121 is determined according to the capacitance C1 and a capacitance of the feedback capacitor C2, i.e., the output voltage signal Vout=Vin*(C1/C2).

The first input terminal of the differential amplifier 123 is coupled to output terminals of a plurality of charge amplifiers corresponding to the plurality of sensing electrodes through a multiplexer circuit (i.e., a switches) 124. For instance, when the multiplexer circuit 124 electrically couples the output terminal of the charge amplifier 121 to the first input terminal of the differential amplifier 123, the charge amplifier 121 may transmit the sensing signal (i.e., the output voltage signal Vout) corresponding to the sensing electrode 111 to the first input terminal of the differential amplifier 123 through the multiplexer circuit 124. The second input terminal of the differential amplifier 123 is coupled to a reference voltage V2 generated by a reference voltage generator 122. The differential amplifier 123 may convert the sensing signal which is as a single-ended signal output by the charge amplifier 121 into a differential output signal OUTdiff1 and then, provide the differential output signal OUTdiff1 to a next stage circuit. The next-stage circuit may be another differential amplifier or an analog-to-digital converter.

However, any unpreferable common-mode disturbance may cause abnormal jitter of the output of the single-ended circuit such as the charge amplifier 121. The charge amplifier 121 and the reference voltage generator 122 are supplied with a system voltage AVDD but have different operation characteristics. The charge amplifier 121 is configured to receive the input voltage signal Vin which is the sensing result from the sensing electrode, and the reference voltage generator 122 is configured to generate the stable reference voltage signal V2. Generally, the reference voltage generator 122 may be a unity gain buffer. A power supply rejection ratio (PSRR) of the reference voltage generator 122 is different from that of the charge amplifier 121. Thus, an input signal of the differential amplifier 123 may likely be interfered by noise in the system voltage AVDD, such that the differential output signal OUTdiff1 of the differential amplifier 123 may be easily interfered by the noise in the system voltage AVDD.

Referring to FIG. 1, the system voltage AVDD may supply power to the charge amplifier 121, the reference voltage generator 122 and other elements. When negative pulse noise occurs in the system voltage AVDD, negative pulse noise may occur in the reference voltage signal V2 of the reference voltage generator 122, and positive pulse noise may occur in the sensing signal (i.e., the output voltage signal Vout) output by the charge amplifier 121. A voltage difference between the reference voltage V2 and the sensing signal (which is a differential input signal of the differential amplifier 123) may be amplified by the differential amplifier 123, as illustrated in FIG. 1, thereby the voltage difference resulted from the noise is amplified as well. Namely, the readout circuit 120 may be likely to amplify the noise on the system voltage AVDD such that the differential output signal OUTdiff1 output by the differential amplifier 123 carries significant noise.

Figure 2:
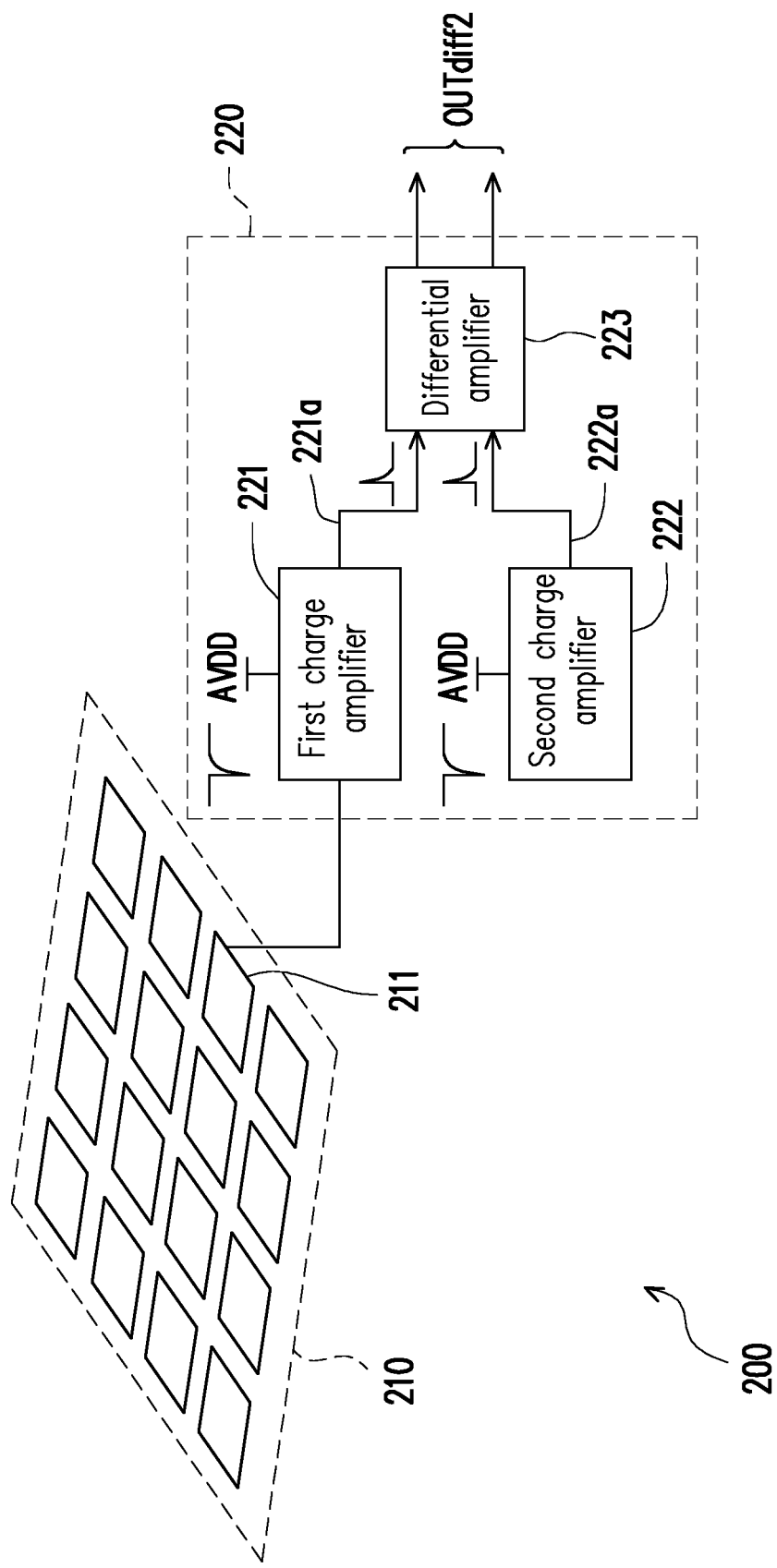
FIG. 2 is a schematic circuit block diagram illustrating a capacitive image sensing device according to an embodiment of the invention.

FIG. 2 is a schematic circuit block diagram illustrating a capacitive image sensing device 200 according to an embodiment of the invention. The capacitive image sensing device 200 includes a sensor array 210 and a readout circuit 220. The sensor array 210 illustrated in FIG. 2 may be inferred with reference to the description related to the sensor array 110 illustrated in FIG. 1 and thus, will not be repeated. The readout circuit 220 includes a plurality of first charge amplifiers 221 respectively corresponding to sensing electrodes of the sensor array 210, a second charge amplifier 222, and a differential amplifier 223. For the illustrative convenience, only one charge amplifier 221 is shown in FIG. 2. Each of the sensing electrodes is electrically coupled to an input terminal of a corresponding charge amplifier 221. For instance, a sensing electrode 211 illustrated in FIG. 2 is electrically coupled to a corresponding charge amplifier 221. In some embodiments, the readout circuit 220 may be implemented as an integrated circuit, and the sensor array 210 may be implemented as another integrated circuit in some embodiments. The readout circuit 220 and the sensor array 210 may be integrated in one integrated circuit in some other embodiments.

Though not shown in FIG. 2, the first charge amplifier 221 may include an operational amplifier, a feedback capacitor and a reset switch, which are similar to the charge amplifier 121 of FIG. 1. The first charge amplifier 221 is configured to receive an input voltage signal that is a signal on a finger which touches the capacitive image sensing device 100, and to amplify the input voltage signal to generate an output voltage signal. The input voltage signal is taken as a sensing result corresponding to the sensing electrode 211 and is related to charge of a capacitance formed between the finger and the sensing electrode 211. The output voltage signal is taken as a sensing signal output by the first charge amplifier 221. The differential amplifier 223 has a first input terminal, a second input terminal and a differential output terminal pair. In some embodiments, the readout circuit 220 may have only one differential amplifier 223 and sensing signals from the plurality of first charge amplifiers 221 are time-divisionally output to the first input terminal of the differential amplifier 223 via a multiplex circuit (not shown in FIG. 2). For example, in a certain time period, the first input terminal of the differential amplifier 223 is coupled to the output terminal of each of the first charge amplifiers 221 to receive a sensing signal 221a. In some other embodiments, the readout circuit 220 may have several differential amplifiers 223, each differential amplifier time-divisionally receiving sensing signals output from a part of the plurality of first charge amplifiers 221.

The second input terminal of the differential amplifier 223 is coupled to an output terminal of the second charge amplifier 222 to receive a reference voltage signal 222a (e.g., a voltage signal). The differential amplifier 223 may convert the sensing signal 221a output from the first charge amplifier 221 into a differential output signal OUTdiff2, and then, the differential output terminal pair of the differential amplifier may provide the differential output signal OUTdiff2 to a next stage circuit (not shown, for example, an analog-to-digital converter and/or a processor). The differential amplifier 223 illustrated in FIG. 2 may be inferred with reference to the description related to the differential amplifier 123 illustrated in FIG. 1 and thus, will not be repeated.

The first charge amplifier 221 and the second charge amplifier 222 have similar operation characteristics. For instance, a PSRR of the second charge amplifier 222 is close to a PSRR of the first charge amplifier 221. The system voltage AVDD may supply power to the first charge amplifier 221, the second charge amplifier 222 and other elements. When the negative pulse noise occurs in the system voltage AVDD, positive pulse noise may occur in the sensing signal 221a output by the first charge amplifier 221, positive pulse noise also may occur in the reference voltage signal 222a output by the second charge amplifier 222. In other words, common-mode noise occurs in the two input signals of the differential amplifier 223. Based on differential characteristics of the differential amplifier 223, the common-mode noise may be offset, and thus, the common-mode noise does not influence the differential output signal OUTdiff2 output by the differential amplifier 223. Thus, the readout circuit 220 illustrated in FIG. 2 may effectively eliminate interference from the power noise.

Figure 3:
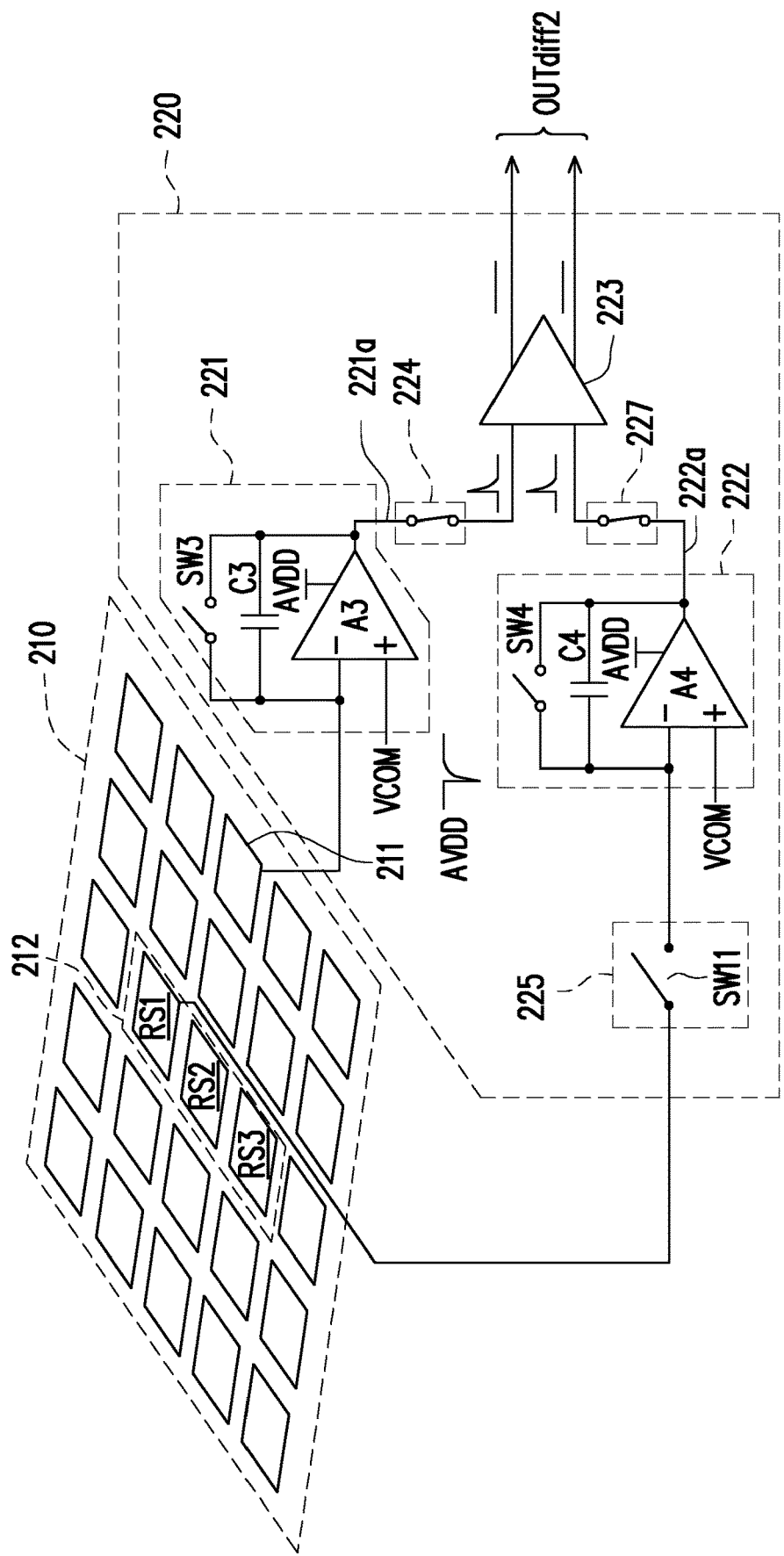
FIG. 3 is a schematic circuit block diagram illustrating the first charge amplifier and the second charge amplifier depicted in FIG. 2 according to an embodiment of the invention.

FIG. 3 is a schematic circuit block diagram illustrating the first charge amplifier 221 and the second charge amplifier 222 depicted in FIG. 2 according to an embodiment of the invention. A part of the content related to the embodiment illustrated in FIG. 3 may be inferred with reference to the description related to FIG. 2 and thus, will not be repeated. The sensor array 210 illustrated in FIG. 3 includes a plurality of sensing electrodes (e.g., the sensing electrode 211) and a reference sensing electrode group 212. Based on a design requirement, the reference sensing electrode group 212 is located in a central region (or any other region) of the sensor array 210. A position of the reference sensing electrode group 212 may be determined based on a design requirement. The reference sensing electrode group 212 includes a plurality of reference sensing electrodes, for example, a reference sensing electrode RS1, a reference sensing electrode RS2 and a reference sensing electrode RS3. The number of the reference sensing electrodes in the reference sensing electrode group 212 may be determined based on a design requirement. In some embodiments, the reference sensing electrodes in the sensor array 210 may be referred to as dummy sensing electrodes. It should be noted that in some embodiments, a material and a layout structure of the reference sensing electrodes are both the same as the sensing electrodes (e.g., the sensing electrode 211).

Based on a design requirement, the sensor array 210 may be disposed with a shielding grid (not shown). The shielding grid may be disposed among the sensing electrodes. Based on a design requirement, the shielding grid may be connected to the ground or connected to any other voltage level. The shielding grid in the sensor array is a conventional technique and thus, will not be repeatedly described. In some other embodiments, the shielding grid may be omitted based on a design requirement.

The capacitive image sensing device 200 may further include a first switching circuit 225. In the embodiment illustrated in FIG. 3, the first switching circuit 225 includes a switch SW11. A first terminal of the switch SW11 of the first switching circuit 225 is coupled to the reference sensing electrode RS1. Based on a design requirement, in other embodiments, the reference sensing electrode RS1 may be disposed outside the sensor array 210. A second terminal of the switch SW11 of the first switching circuit 225 is coupled to an input terminal of the second charge amplifier 222. The first switch SW11 of the first switching circuit 225 may selectively electrically connect and disconnect the reference sensing electrode RS1 and the input terminal of the second charge amplifier 222. For instance, in a first operation mode, the switch SW11 electrically connects the reference sensing electrode RS1 to the input terminal of the second charge amplifier 222, and in a second operation mode, the switch SW11 electrically disconnects the reference sensing electrode RS1 from the input terminal of the second charge amplifier 222.

In the embodiment illustrated in FIG. 3, the first charge amplifier 221 includes an operation amplifier A3, a feedback capacitor C3 and a reset switch SW3. The operation amplifier A3 has an inverting input terminal, a non-inverting input terminal and an output terminal. The inverting input terminal of the operation amplifier A3 is coupled to the sensing electrode 211 of the sensor array 210. The non-inverting input terminal of the operation amplifier A3 is coupled to a reference voltage signal VCOM. A level of the reference voltage signal VCOM may be determined based on a design requirement. The output terminal of the operation amplifier A3 is coupled to the first input terminal of the differential amplifier 223. The feedback capacitor C3 is coupled between the inverting input terminal of the operation amplifier A3 and the output terminal of the operation amplifier A3. The reset switch SW3 is coupled between the inverting input terminal of the operation amplifier A3 and the output terminal of the operation amplifier A3. The first charge amplifier 221 illustrated in FIG. 3 may be inferred with reference to the description related to the charge amplifier 121 illustrated in FIG. 1 and thus, will not be repeated.

In the embodiment illustrated in FIG. 3, the second charge amplifier 222 includes an operation amplifier A4, a feedback capacitor C4 and a reset switch SW4. The operation amplifier A4 has an inverting input terminal, a non-inverting input terminal and an output terminal. The inverting input terminal of the operation amplifier A4 is coupled to the second terminal of the switch SW11 of the first switching circuit 225. The non-inverting input terminal of the operation amplifier A4 is coupled to the reference voltage signal VCOM. The output terminal of the operation amplifier A4 is coupled to the second input terminal of the differential amplifier 223. The feedback capacitor C4 is coupled between the inverting input terminal of the operation amplifier A4 and the output terminal of the operation amplifier A4. The reset switch SW4 is coupled between the inverting input terminal of the operation amplifier A4 and the output terminal of the operation amplifier A4.

Based on a design requirement, the readout circuit 220 may allow the same differential amplifier 223 to time-divisionally receive the sensing signal output by the first charge amplifiers. For instance, a multiplexer circuit (a switch) 224 for time-dividing control may be disposed between the output terminal of the first charge amplifier 221 and the first input terminal of the differential amplifier 223. For the circuit symmetry, a switch 227 may be disposed between the output terminal of the second charge amplifier 222 and the second input terminal of the differential amplifier 223. The readout circuit 220 may include one or more second charge amplifiers 222, and each of the second charge amplifiers 222 may supply a reference voltage signal to a corresponding differential amplifier. It is to be noted that the numbers of the second charge amplifiers 222 and the corresponding relationship between the differential amplifiers 223 and the second charge amplifiers 222 in the readout circuit 220 are not limited in the invention.

For instance, the first input terminal of the differential amplifier 223 is selectively coupled to the output terminal of one of the first charge amplifiers corresponding to the sensing electrodes through the multiplexer circuit (the switch) 224. When the multiplexer circuit 224 electrically couples the output terminal of the charge amplifier 221 to the first input terminal of the differential amplifier 223, the first charge amplifier 221 may transmit a sensing signal corresponding to the sensing electrode 211 to the first input terminal of the differential amplifier 223 through the multiplexer circuit 224.

During a reset period with respect to the sensing electrode 211, the multiplexer circuit 224 prevents the output terminal of the first charge amplifier 221 from being connected to the first input terminal of the differential amplifier 223, the reset switches SW3 are turned on, and thus, charges of the feedback capacitors C3 and C4 may be reset. During the reset period with respect to the sensing electrode 211, the reset switch SW4 of the second charge amplifier 222 may be turn off and the switch 227 may be turned on, for a sensing period with respect to the other sensing electrode. In a sensing period with respect to the sensing electrode 211, the multiplexer circuit 224 electrically connects the output terminal of the first charge amplifier 221 to the first input terminal of the differential amplifier 223, the reset switch SW3 is turned off, and thus, the first charge amplifier 221 forms a unity gain amplifier, such that the first charge amplifier 221 may receive the sensing result corresponding to the sensing electrode 211 and output the sensing signal 221a to the first input terminal of the differential amplifier 223. In the sensing period with respect to the sensing electrode 211, the reset switch SW4 is turned off and the switch 227 is turned on, and thus, the second charge amplifier 222 may provide the reference voltage signal 222a to the second input terminal of the differential amplifier 223, such that the differential amplifier 223 may convert the sensing signal 221a output by the first charge amplifier 221 into the differential output signal OUTdiff2 and then, provide the differential output signal OUTdiff2 to a next stage circuit (not shown) through the differential output terminal pair of the differential amplifier 223.

In the embodiment illustrated in FIG. 3, the circuit structure of the second charge amplifier 222 configured to provide the reference voltage signal is similar to (or the same as) the circuit structure of the first charge amplifier 221 configured to receive the sensing result from the sensing electrode and generate the sensing signal output to the differential amplifier 223. Thus, the PSRR of the second charge amplifier 222 is similar to (or the same as) the PSRR of the first charge amplifier 221. Referring to FIG. 3, the system voltage AVDD may supply power to the first charge amplifier 221, the second charge amplifier 222 and other elements. When the negative pulse noise occurs in the system voltage AVDD, positive pulse noise may occur in the reference voltage signal 222a provided by the second charge amplifier 222, and positive pulse noise may occur in the sensing signal 221a output by the first charge amplifier 221. In other words, the common-mode noise occurs in the two input of the differential amplifier 223. The differential characteristics of the differential amplifier 223 may offset the common-mode noise. Thus, the common-mode noise does not influence the differential output signal OUTdiff2 output by the differential amplifier 223. Thus, the readout circuit structure illustrated in FIG. 3 may effectively eliminate interference from the power noise.

Figure 4:
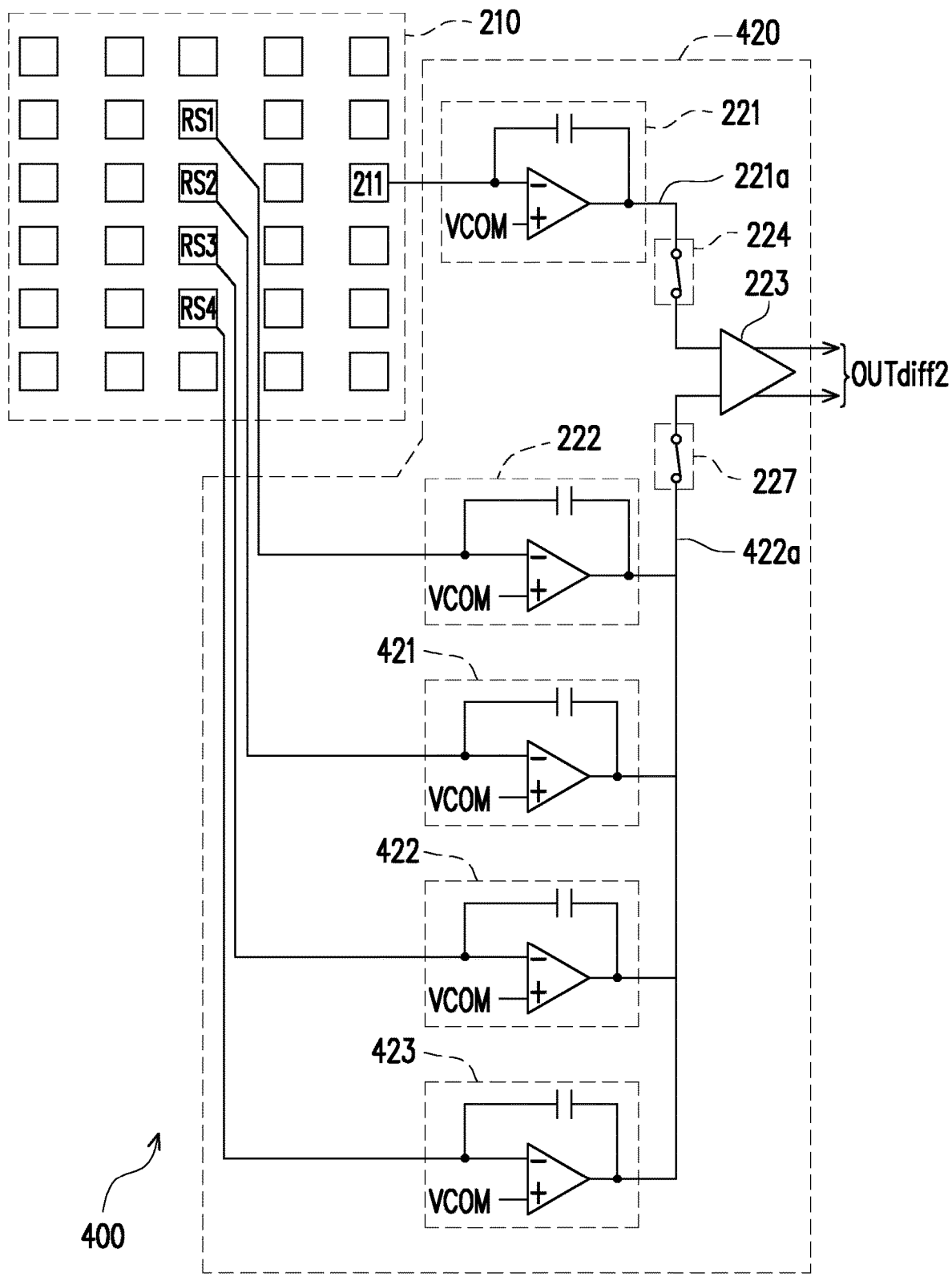
FIG. 4 is a schematic circuit block diagram illustrating a capacitive image sensing device according to another embodiment of the invention.

FIG. 4 is a schematic circuit block diagram illustrating a capacitive image sensing device 400 according to another embodiment of the invention. The capacitive image sensing device 400 includes a sensor array 210 and a readout circuit 420. The sensor array 210 illustrated in FIG. 4 may be inferred with reference to the description related to the sensor array 210 illustrated in FIG. 3 and thus, will not be repeated. In the embodiment illustrated in FIG. 4, the reference sensing electrode group of the sensor array 210 includes a reference sensing electrode RS1, a reference sensing electrode RS2, a reference sensing electrode RS3 and a reference sensing electrode RS4.

The readout circuit 420 may receive a sensing result corresponding to the sensor array 210. Based on a design requirement, the readout circuit 420 may be implemented as an integrated circuit, and the sensor array 210 may be implemented as another integrated circuit in some embodiments. In other embodiments, the readout circuit 420 and the sensor array 210 may be integrated as an integrated circuit.

The readout circuit 420 of the capacitive image sensing device 400 includes a first charge amplifier 221, a second charge amplifier 222, a differential amplifier 223, a multiplexer circuit 224, a switch 227, a third charge amplifier 421, a fourth charge amplifier 422 and a fifth charge amplifier 423. The first charge amplifier 221 illustrated in FIG. 4 may be inferred with reference to the description related to the first charge amplifier 221 illustrated in FIG. 3, the second charge amplifier 222, the third charge amplifier 421, the fourth charge amplifier 422 and the fifth charge amplifier 423 illustrated in FIG. 4 may be inferred with reference to the description related to the second charge amplifier 222 illustrated in FIG. 3, and the differential amplifier 223, the multiplexer circuit 224 and the switch 227 illustrated in FIG. 4 may be inferred with reference to the descriptions related to the differential amplifier 223, the multiplexer circuit 224 and the switch 227 illustrated in FIG. 3, which will not be repeated.

Referring to FIG. 4, an output terminal of the second charge amplifier 222, an output terminal of the third charge amplifier 421, an output terminal of the fourth charge amplifier 422 and an output terminal of the fifth charge amplifier 423 are jointly coupled to the second input terminal of the differential amplifier 223. An input terminal of the second charge amplifier 222 is coupled to the reference sensing electrode RS1. An input terminal of the third charge amplifier 421 is coupled to the reference sensing electrode RS2. An input terminal of the fourth charge amplifier 422 is coupled to the reference sensing electrode RS3. An input terminal of the fifth charge amplifier 423 is coupled to the reference sensing electrode RS4.

It is assumed here that the sensor array 210 is employed to sense a fingerprint image. When a finger approaches the sensor array 210, some of the sensing electrodes of the sensor array 210 sense a fingerprint peak of the finger, and the other of the sensing electrodes of the sensor array 210 sense a fingerprint valley of the finger. Thus, the readout circuit 220 may obtain a sensing capacitance value with respect to a position of the fingerprint peak (which is referred to as a fingerprint-peak capacitance value) and a sensing capacitance value with respect to a position of the fingerprint valley (which is referred to as a fingerprint-valley capacitance value) with the first charge amplifiers (e.g., the first charge amplifier 221).

When the finger approaches the sensor array 210, the finger also approaches the reference sensing electrodes RS1, RS2, RS3 and/or RS4 of the reference sensing electrode group of the sensor array 210. The second charge amplifier 222 may read/amplify a sensing result of the reference sensing electrode RS1, the third charge amplifier 421 may read/amplify a sensing result of the reference sensing electrode RS2, the fourth charge amplifier 422 may read/amplify a sensing result of the reference sensing electrode RS3, and the fifth charge amplifier 423 may read/amplify a sensing result of the reference sensing electrode RS4. Thus, the second charge amplifier 222 may output a reference voltage signal with respect to the reference sensing electrode RS1 to the second input terminal of the differential amplifier 223, the third charge amplifier 421 may output a reference voltage signal with respect to the reference sensing electrode RS2 to the second input terminal of the differential amplifier 223, the fourth charge amplifier 422 may output a reference voltage signal with respect to the reference sensing electrode RS3 to the second input terminal of the differential amplifier 223, and the firth charge amplifier 423 may output a reference voltage signal with respect to the reference sensing electrode RS4 to the second input terminal of the differential amplifier 223. The reference voltage signal of the second input terminal of the differential amplifier 223 is equivalent to an average of a plurality of fingerprint-peak capacitance values and a plurality of fingerprint-valley capacitance values. The average value is approximate to a median value of the fingerprint-peak capacitance values and the fingerprint-valley capacitance values. As the reference voltage signals (e.g., the reference voltage signal 422a corresponding to the reference sensing electrodes) and the fingerprint sensing result (e.g., the sensing signal 221a) both come from the sensor array 210, the noise of the second input terminal of the differential amplifier 223 may probably be approximate to the noise of the first input terminal of the differential amplifier 223. Thus, the differential amplifier 223 may eliminate the noise (i.e., the common-mode noise).

Figure 5:
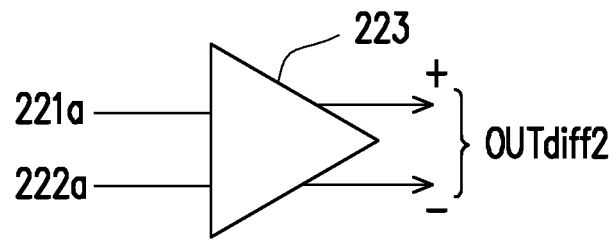
FIG. 5 and FIG. 6 illustrate operations of the differential amplifier in different embodiments for comparison.
Figure 5:
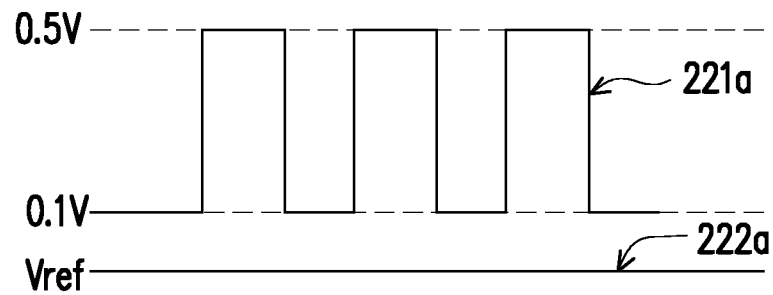
Figure 6:
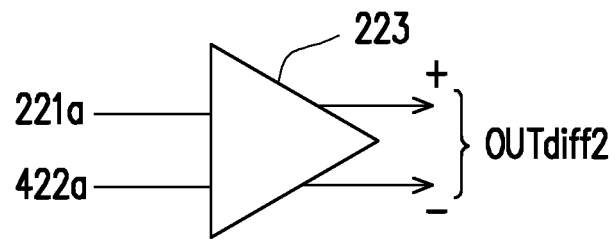
Figure 6:
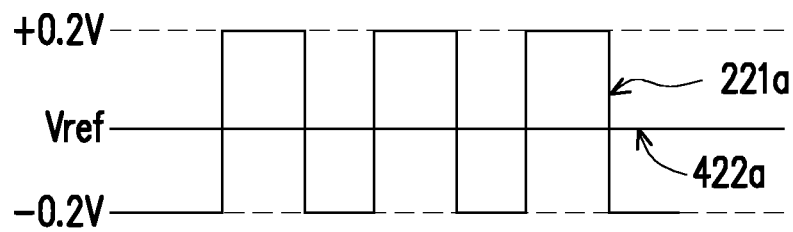

FIG. 5 and FIG. 6 illustrate operations of the differential amplifier 223 in different embodiments for comparison. FIG. 5 is a schematic waveform diagram of the input signals of the differential amplifier 223 depicted in FIG. 2. FIG. 6 is a schematic waveform diagram of the input signals of the differential amplifier 223 depicted in FIG. 4. In FIG. 5 and FIG. 6, the horizontal axis represents the position of the sensing electrode, and the vertical axis represents voltage level of the input signals of the differential amplifier 223.

Referring to FIG. 2 and FIG. 5, the input signals of the differential amplifier 223 are the sensing signal 221a and the reference voltage signal 222a. In the example illustrated in FIG. 2, a level of the sensing signal 221a follows the voltage level of the non-inverting terminal of the operational amplifier of the second charge amplifier 222. It is assumed that a level of the sensing signal 221a corresponding to a fingerprint-peak position is 0.5 V, and a level of the sensing signal 221a corresponding to fingerprint-valley position is 0.1 V. It is further assumed that a level of the reference voltage signal VCOM of the second charge amplifier 222 is 0 V. The level of the reference voltage signal 222a, denoted as Vref, output by the second charge amplifier 222 is 0 V, as illustrated in FIG. 5. Thus, a differential input signal of the differential amplifier 223 illustrated in FIG. 2 includes a DC offset component. Such DC offset component is amplified by the differential amplifier 223, and the amplified DC offset component has to be filtered by an additional circuit.

Referring to FIG. 4 and FIG. 6, the input signals of the differential amplifier 223 are the sensing signal 221a and the reference sensing signal 422a. In the example illustrated in FIG. 6, it is assumed that the level of the sensing signal 221a corresponding to the fingerprint-peak position is +0.2 V, and the level of the sensing signal 221a corresponding to the fingerprint-valley position is −0.2 V. Since the reference voltage signal 422a is corresponding to an average capacitance with respect to ridges and valleys of the fingerprint, the level of the reference voltage signal 422a, denoted as Vref, may be approximate to the average of the levels of the sensing signal 221a corresponding to the fingerprint ridge positions and the fingerprint valley positions, as illustrated in FIG. 6. In this situation, the DC offset component in the differential input signal of the differential amplifier 223 may be significantly reduced, and the differential input signal is approximate to an AC signal without DC offset component. According to the embodiment illustrated in FIG. 4, the reference voltage signal 422a may be adaptively changed according to an application environment of the sensor array 210. In this way, the DC offset component that is not required to be amplified may be eliminated in advance as much as possible.

Figure 7:
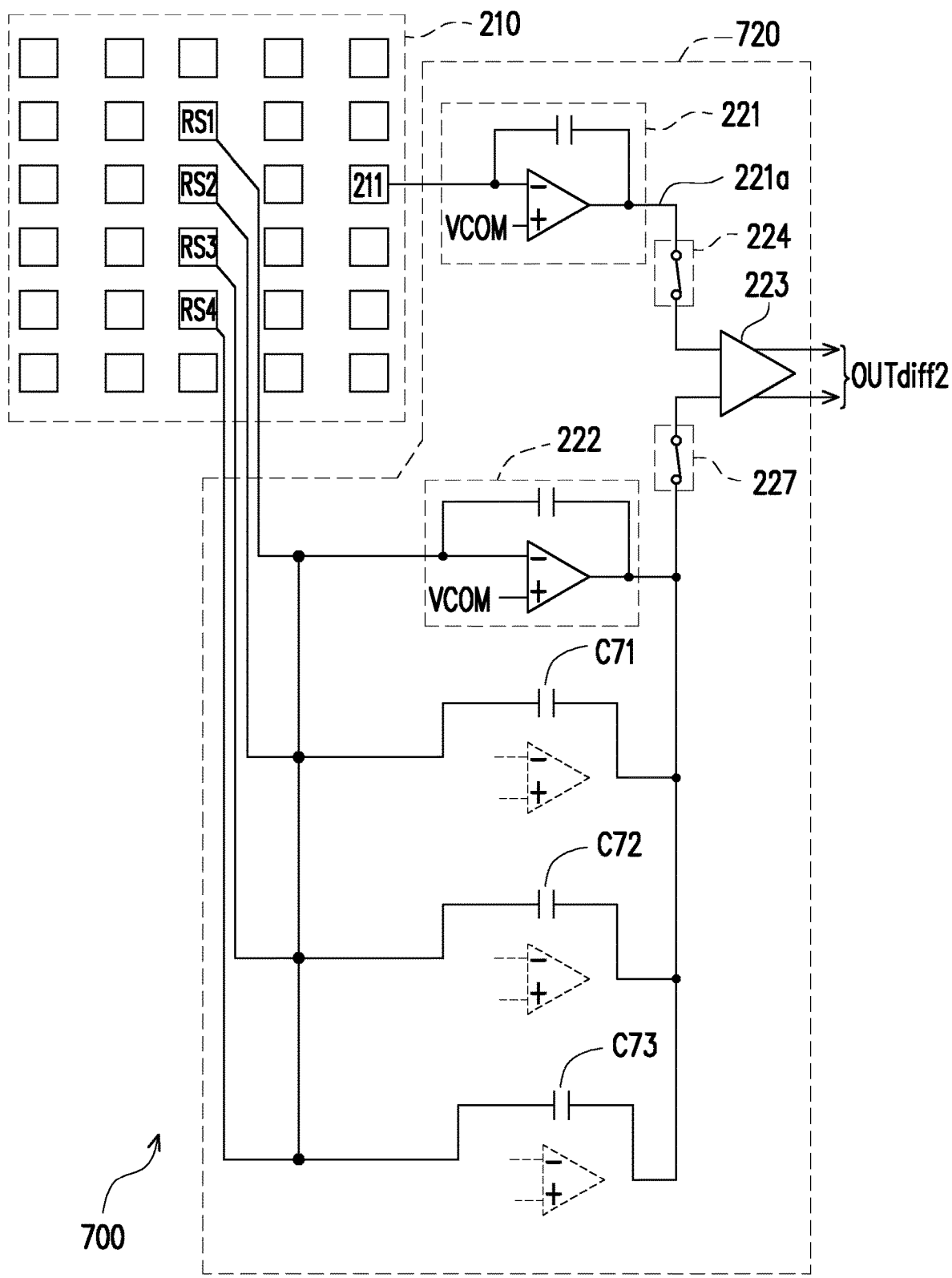
FIG. 7 is a schematic circuit block diagram illustrating a capacitive image sensing device according to another embodiment of the invention.

FIG. 7 is a schematic circuit block diagram illustrating a capacitive image sensing device 700 according to another embodiment of the invention. The capacitive image sensing device 700 includes a sensor array 210 and a readout circuit 720. The sensor array 210 illustrated in FIG. 7 may be inferred with reference to the description related to the sensor array 210 illustrated in FIG. 4 and thus, will not be repeated. The readout circuit 720 may receive a sensing result corresponding to the sensor array 210. Based on a design requirement, the readout circuit 720 may be implemented as an integrated circuit, and the sensor array 210 may be implemented as another integrated circuit in some embodiments. In other embodiments, the readout circuit 720 and the sensor array 210 may be integrated as an integrated circuit.

The readout circuit 720 of the capacitive image sensing device 700 includes a first charge amplifier 221, a second charge amplifier 222, a differential amplifier 223, a multiplexer circuit 224, a switch 227, a capacitor C71, a capacitor C72 and a capacitor C73. The first charge amplifier 221 illustrated in FIG. 7 may be inferred with reference to the description related to the first charge amplifier 221 illustrated in FIG. 3, the second charge amplifier 222 illustrated in FIG. 7 may be inferred with reference to the description related to the second charge amplifier 222 illustrated in FIG. 3, and the differential amplifier 223, the multiplexer circuit 224 and the switch 227 illustrated in FIG. 7 may be inferred with reference to the descriptions related to the differential amplifier 223, the multiplexer circuit 224 and the switch 227 illustrated in FIG. 3, which will not be repeated.

In the embodiment illustrated in FIG. 7, the input terminal of the second charge amplifier 222 is coupled to the reference sensing electrodes RS1, RS2, RS3 and RS4 of the reference sensing electrode group of the sensor array 210. The input terminal of the second charge amplifier 222 is coupled to the first terminal of the capacitor C71, the first terminal of the capacitor C72 and the first terminal of the capacitor C73. The output terminal of the second charge amplifier 222 is coupled to the second terminal of the capacitor C71, the second terminal of the capacitor C72 and the second terminal of the capacitor C73. Compared with the embodiment illustrated in FIG. 4, the readout circuit 720 illustrated in FIG. 7 is omitted from the operational amplifiers of the charge amplifiers 421, 422 and 423 shown in FIG. 4. The readout circuit 720 illustrated in FIG. 7 may be inferred with reference to the description related to FIG. 4 and FIG. 6 and thus, will not be repeated.

Figure 8:
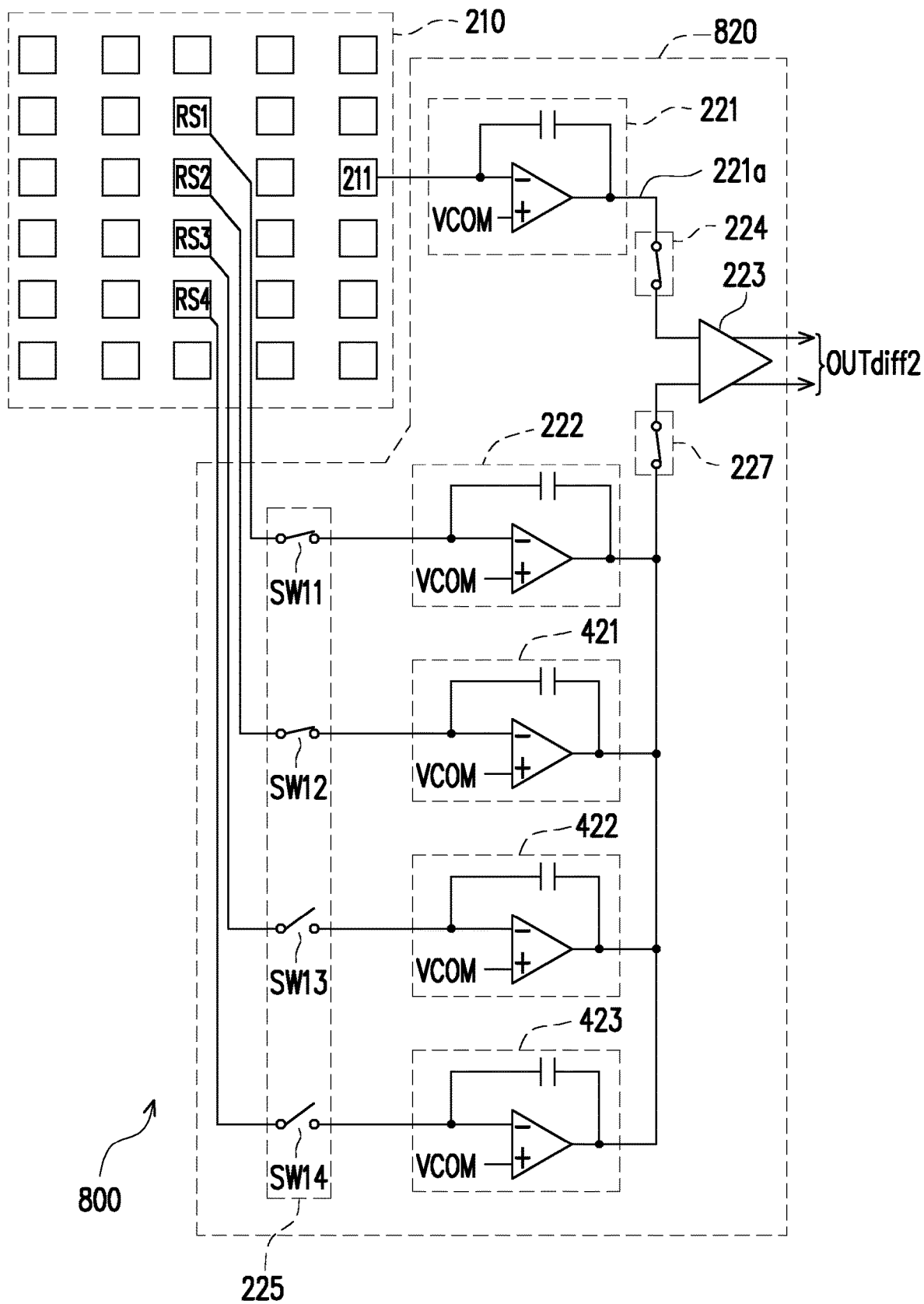
FIG. 8 is a schematic circuit block diagram illustrating a capacitive image sensing device according to another embodiment of the invention.

FIG. 8 is a schematic circuit block diagram illustrating a capacitive image sensing device 800 according to another embodiment of the invention. The capacitive image sensing device 800 includes a sensor array 210 and a readout circuit 820. The sensor array 210 illustrated in FIG. 8 may be inferred with reference to the description related to the sensor array 210 illustrated in FIG. 4 and thus, will not be repeated. The readout circuit 820 may receive a sensing result corresponding to the sensor array 210. Based on a design requirement, the readout circuit 820 may be implemented as an integrated circuit, and the sensor array 210 may be implemented as another integrated circuit in some embodiments. In other embodiments, the readout circuit 820 and the sensor array 210 may be integrated as an integrated circuit.

The readout circuit 820 of the capacitive image sensing device 800 includes a first charge amplifier 221, a second charge amplifier 222, a differential amplifier 223, a multiplexer circuit 224, a switch 227, a third charge amplifier 421, a fourth charge amplifier 422, a fifth charge amplifier 423 and a first switching circuit 225. In the embodiment illustrated in FIG. 8, the first switching circuit 225 includes a switch SW11, a switch SW12, a switch SW13 and a switch SW14. The first charge amplifier 221 illustrated in FIG. 8 may be inferred with reference to the description related to the first charge amplifier 221 illustrated in FIG. 3, the second charge amplifier 222, the third charge amplifier 421, the fourth charge amplifier 422 and the fifth charge amplifier 423 illustrated in FIG. 8 may be inferred with reference to the description related FIG. 4, and the differential amplifier 223, the multiplexer circuit 224 and the switch 227 illustrated in FIG. 8 may be inferred with reference to the descriptions related to the differential amplifier 223, the multiplexer circuit 224 and the switch 227 illustrated in FIG. 3, which will not be repeated.

Referring to FIG. 8, an input terminal of the second charge amplifier 222 is coupled to a second terminal of the switch SW11 of the first switching circuit 225. A first terminal of the switch SW11 is coupled to the reference sensing electrode RS1. The switch SW11 of the first switching circuit 225 may selectively electrically connect and disconnect the reference sensing electrode RS1 and the input terminal of the second charge amplifier 222. An input terminal of the third charge amplifier 421 is coupled to a second terminal of the switch SW12 of the first switching circuit 225. A first terminal of the switch SW12 is coupled to the reference sensing electrode RS2. The switch SW12 of the first switching circuit 225 may selectively electrically connect and disconnect the reference sensing electrode RS2 and the input terminal of the third charge amplifier 421. An input terminal of the fourth charge amplifier 422 is coupled to a second terminal of the switch SW13 of the first switching circuit 225. A first terminal of the switch SW13 is coupled to the reference sensing electrode RS3. The switch SW13 of the first switching circuit 225 may selectively electrically connect and disconnect the reference sensing electrode RS3 and the input terminal of the fourth charge amplifier 422. An input terminal of the fifth charge amplifier 423 is coupled to a second terminal of the switch SW14 of the first switching circuit 225. A first terminal of the switch SW14 is coupled to the reference sensing electrode RS4. The switch SW14 of the first switching circuit 225 may selectively electrically connect and disconnect the reference sensing electrode RS4 and the input terminal of the fifth charge amplifier 423.

For instance, in the first operation mode, the switch SW11 of the first switching circuit 225 electrically connects the reference sensing electrode RS1 to the input terminal of the second charge amplifier 222, the switch SW12 of the first switching circuit 225 electrically connects the reference sensing electrode RS2 to the input terminal of the third charge amplifier 421, the switch SW13 of the first switching circuit 225 electrically connects the reference sensing electrode RS3 to the input terminal of the fourth charge amplifier 422, and the switch SW14 of the first switching circuit 225 electrically connects the reference sensing electrode RS4 to the input terminal of the fifth charge amplifier 423. In the second operation mode, the switch SW11 electrically disconnects the reference sensing electrode RS1 from the input terminal of the second charge amplifier 222, the switch SW12 electrically disconnects the reference sensing electrode RS2 from the input terminal of the third charge amplifier 421, the switch SW13 electrically disconnects the reference sensing electrode RS3 from the input terminal of the fourth charge amplifier 422, and the switch SW14 electrically disconnects the reference sensing electrode RS4 from the input terminal of the fifth charge amplifier 423.

For instance, in the first operation mode, the switch SW11 and the switch SW12 are turned on, and the switch SW13 and the switch SW14 are turned off. In the second operation mode, the switch SW11, the switch SW12, the switch SW13 and the switch SW14 are turned off. The readout circuit 820 illustrated in FIG. 8 may be inferred with reference to the description related to FIG. 4 and FIG. 6 and thus, will not be repeated.

Figure 9:
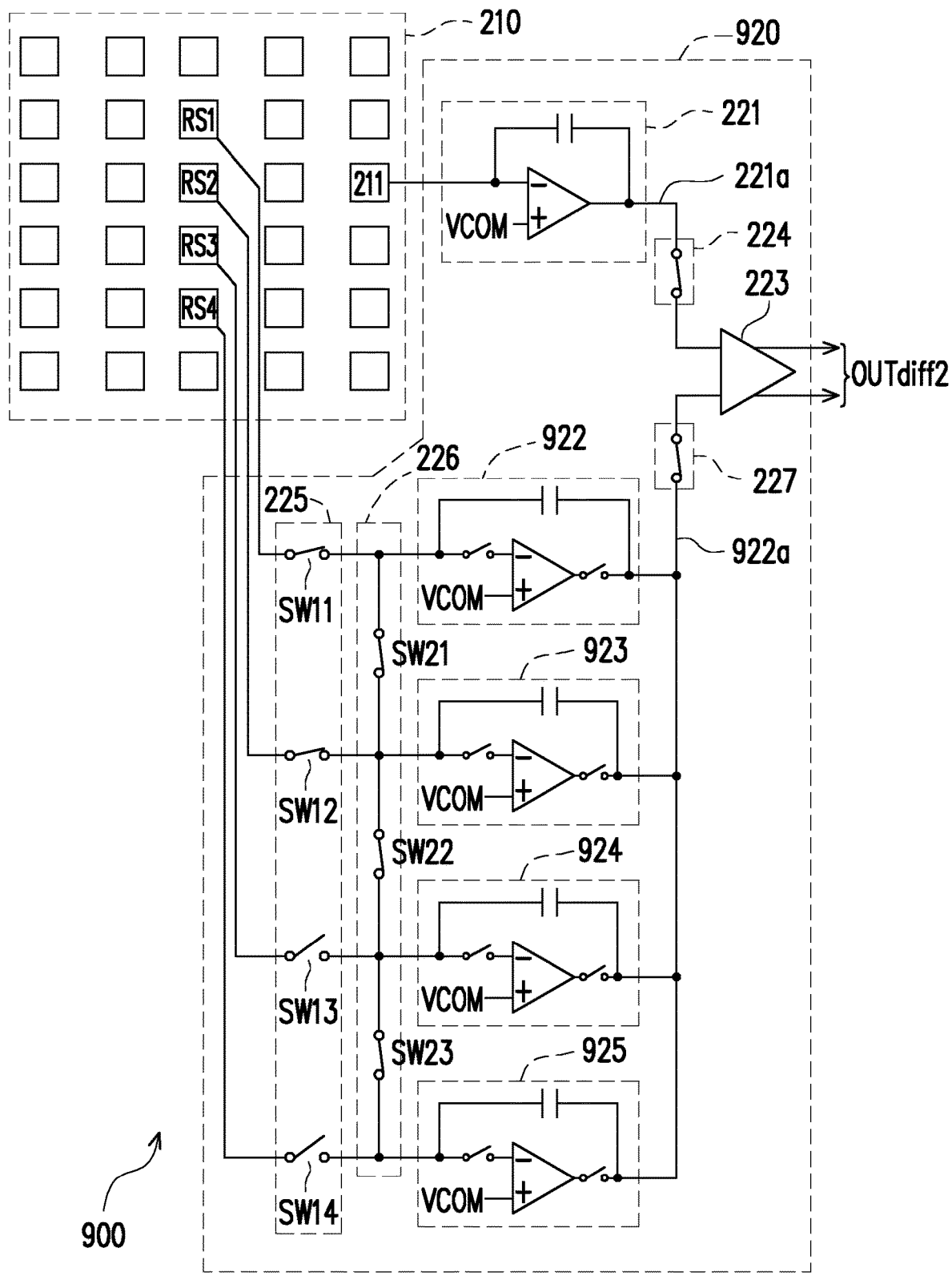
FIG. 9 is a schematic circuit block diagram illustrating a capacitive image sensing device according to yet another embodiment of the invention.

FIG. 9 is a schematic circuit block diagram illustrating a capacitive image sensing device 900 according to yet another embodiment of the invention. The capacitive image sensing device 900 includes a sensor array 210 and a readout circuit 920. The sensor array 210 illustrated in FIG. 9 may be inferred with reference to the descriptions related to the sensor arrays 210 illustrated in FIG. 3 and FIG. 4 and thus, will not be repeated. The readout circuit 920 may receive a sensing result corresponding to the sensor array 210. Based on a design requirement, the readout circuit 920 may be implemented as an integrated circuit, and the sensor array 210 may be implemented as another integrated circuit in some embodiments. The readout circuit 920 and the sensor array 210 may be integrated as an integrated circuit in some other embodiments.

The readout circuit 920 of the capacitive image sensing device 900 includes a first charge amplifier 221, a second charge amplifier 922, a third charge amplifier 923, a fourth charge amplifier 924, a fifth charge amplifier 925, a differential amplifier 223, a multiplexer circuit 224, a switch 227, a first switching circuit 225 and a second switching circuit 226. In the embodiment illustrated in FIG. 9, the first switching circuit 225 includes a switch SW11, a switch SW12, a switch SW13 and a switch SW14, and the second switching circuit 226 includes a switch SW21, a switch SW22 and a switch SW23. The first charge amplifier 221 illustrated in FIG. 9 may be inferred with reference to the descriptions related to the first charge amplifiers 221 illustrated in FIG. 3 and FIG. 4, the second charge amplifier 922, the third charge amplifier 923, the fourth charge amplifier 924, a fifth charge amplifier 925 and the first switching circuit 225 illustrated in FIG. 9 may be inferred with reference to the descriptions related to the second charge amplifier 222, the third charge amplifier 421, the fourth charge amplifier 422, a fifth charge amplifier 423 and the first switching circuit 225 illustrated in FIG. 8, and the differential amplifier 223, the multiplexer circuit 224 and the switch 227 illustrated in FIG. 9 may be inferred with reference to the descriptions related to the differential amplifiers 223, the multiplexer circuits 224 and the switch 227 illustrated in FIG. 3 and FIG. 4, which will not be repeated.

In the embodiment illustrated in FIG. 9, the switch SW21 of the second switching circuit 226 may selectively electrically connect and disconnect an input terminal of the second charge amplifier 922 and an input terminal of the third charge amplifier 923. Namely, the switch SW21 may selectively electrically connect in parallel and disconnect the feedback capacitor of the second charge amplifier 922 and the feedback capacitor of the third charge amplifier 923. The switch SW22 of the second switching circuit 226 may selectively electrically connect and disconnect the input terminal of the third charge amplifier 923 and an input terminal of the fourth charge amplifier 924. Namely, the switch SW22 may selectively electrically connect in parallel and disconnect the feedback capacitor of the third charge amplifier 923 and the feedback capacitor of the fourth charge amplifier 924. The switch SW23 of the second switching circuit 226 may selectively electrically connect and disconnect the input terminal of the fourth charge amplifier 924 and an input terminal of the fifth charge amplifier 925. Namely, the switch SW23 may selectively electrically connect in parallel and disconnect the feedback capacitor of the fourth charge amplifier 924 and the feedback capacitor of the fifth charge amplifier 925.

For instance, in the first operation mode, the second switching circuit 226 electrically connects the input terminal of the second charge amplifier 922 to the input terminal of the third charge amplifier 923, the input terminal of the fourth charge amplifier 924 and the input terminal of the fifth charge amplifier 925 (i.e., electrically connects in parallel the feedback capacitors of the charge amplifiers 922, 923, 924 and 925.) In this circumstance, one or more of the operational amplifiers of the charge amplifiers 922, 923, 924 and 925 may be disabled, thereby reducing power consumption of the capacitive image sensing device 900. For instance, in the first operation mode, only the second charge amplifier 922 is enabled, and the third charge amplifier 923, the fourth charge amplifier 924 and the fifth charge amplifier 925 are disabled. In the first operation mode, based on a design requirement, one or more of the switches SW11, SW12, SW13 and SW14 of the first switch circuit 225 is/are turned on. In some other embodiments, in the first operation mode, the switches SW11 and SW12 of the first switching circuit 225 are turned on, and the switches SW13 and SW14 of the first switching circuit 225 are turned off.

The manner of switches/switching of the first operation mode are not limited to the manner described above. The manner of switches/switching of the first operation mode may be determined based on a design requirement. For instance, in some other embodiments, in the first operation mode, the switch SW21 of the second switching circuit 226 is turned on, but the switch SW22 and the switch SW23 are turned off. The switch SW21 electrically connects the input terminal of the second charge amplifier 922 to the input terminal of the third charge amplifier 923 (i.e., electrically connects in parallel the feedback capacitor of the second charge amplifier 922 and the feedback capacitor of the third charge amplifier 923). In the first operation mode, the first switch circuit 225 is turned on. In this circumstance, one of the operational amplifier of the second charge amplifier 922 and the operational amplifier of the third charge amplifier 923 may be disabled, and only one of the second charge amplifier 922 and the third charge amplifier 923 may be enabled, thereby reducing the power consumption of the capacitive image sensing device 900.

In the second operation mode, the switch SW21 of the second switching circuit 226 electrically disconnects the input terminal of the second charge amplifier 922 from the input terminal of the third charge amplifier 923 (i.e., electrically disconnects the feedback capacitor of the second charge amplifier 922 from the feedback capacitor of the third charge amplifier 923). In the second operation mode, the switch SW22 of the second switching circuit 226 electrically disconnects the input terminal of the third charge amplifier 923 from the input terminal of the fourth charge amplifier 924 (i.e., electrically disconnects the feedback capacitor of the third charge amplifier 923 from the feedback capacitor of the fourth charge amplifier 924). In the second operation mode, the switch SW23 of the second switching circuit 226 electrically disconnects the input terminal of the fourth charge amplifier 924 from the input terminal of the fifth charge amplifier 925 (i.e., electrically disconnects the feedback capacitor of the fourth charge amplifier 924 from the feedback capacitor of the fifth charge amplifier 925).

According to the reference voltage signal 922a, the differential amplifier 223 may convert the sensing signal 221a (i.e., the amplified sensing result) of the first charge amplifier 221 into the differential output signal OUTdiff2 and then, provide the differential output signal OUTdiff2 to a next stage circuit (not shown, for example, an analog-to-digital converter and/or a processor) through the differential output terminal pair of the differential amplifier 223. The next stage circuit may determine whether or not an object (e.g., a finger) touches the sensor array 210 according to the differential output signal OUTdiff2 and sense an image (e.g., a fingerprint image) with the sensor array 210 and the readout circuit 920. In a condition that the finger touches the sensor array 210, the next stage circuit may determine whether the sensor array 210 is heavily pressed. When the finger heavily presses the sensor array 210, the next stage circuit may perform a capacitive image sensing method that will be set forth below to compensate the image in the condition that the finger heavily presses the sensor array 210.

Figure 10:
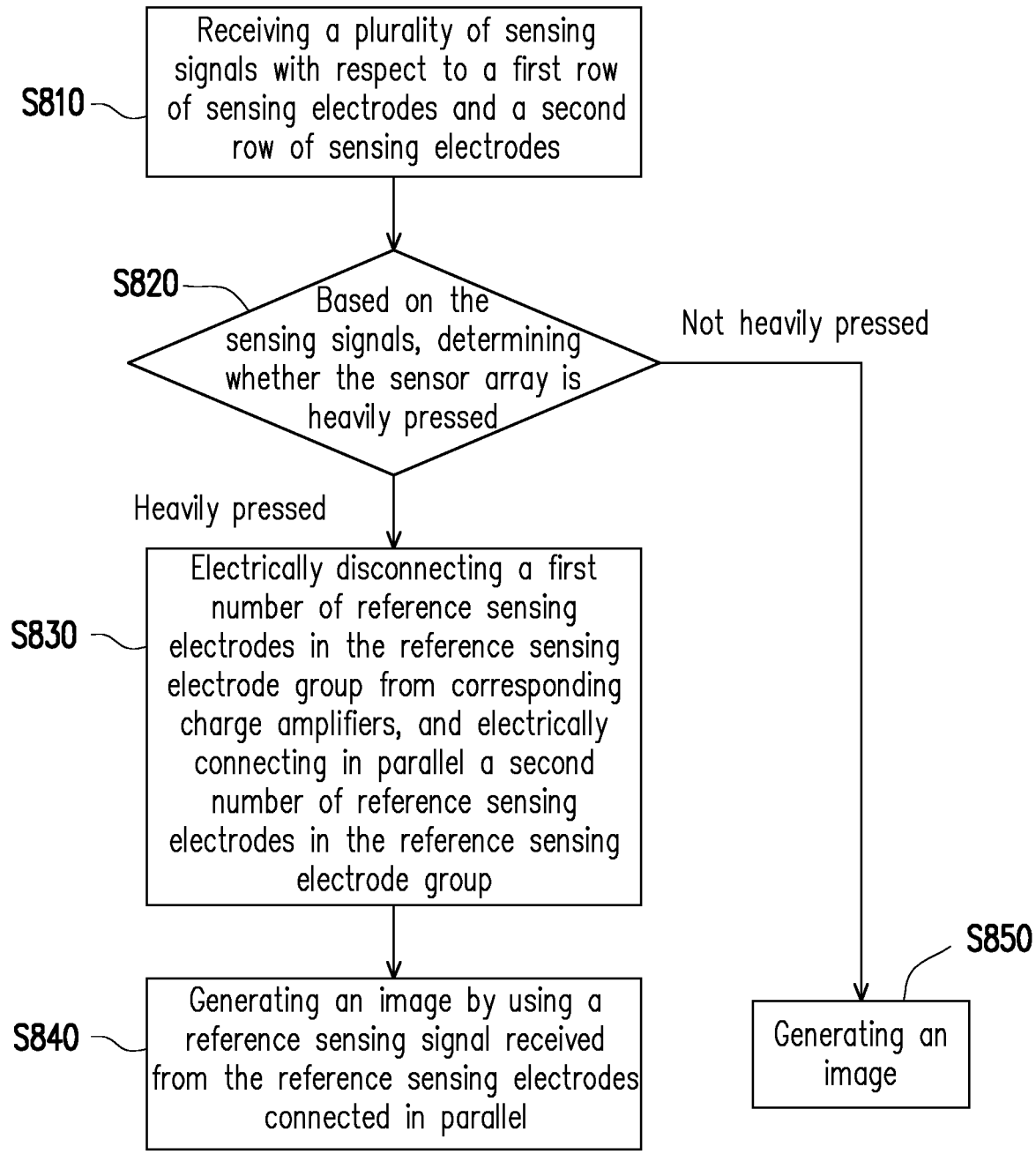
FIG. 10 is a flowchart of a capacitive image sensing method according to an embodiment of the invention.

FIG. 10 is a flowchart of a capacitive image sensing method according to an embodiment of the invention. In the sensing method, an image (e.g., a fingerprint image) may be sensed by the sensor array 210. Referring to FIG. 9 and FIG. 10, in step S810, a next stage circuit (not shown, for example, an analog-to-digital converter and/or a processor) receives a plurality of sensing signals with respect to the sensing electrodes of the first row ROW1 and the sensing electrodes of the second row ROW2 through the readout circuit 920. The sensing electrodes of the first row ROW1 and the sensing electrodes of the second row ROW2 are parts of the plurality of sensing electrodes in the sensor array 210 and are located adjacent to the reference sensing electrode group (which includes, for example, the reference sensing electrode RS1, the reference sensing electrode RS2, the reference sensing electrode RS3 and the reference sensing electrode RS4 illustrated in FIG. 9).

In other embodiments, the second input terminal of the differential amplifier 223 may be coupled to the reference voltage signal VCOM. According to the reference voltage signal VCOM, the differential amplifier 223 may convert the sensing signal 221a of the first charge amplifier 221 into the differential output signal OUTdiff2 and then, provide the differential output signal OUTdiff2 to a next stage circuit (not shown, for example, an analog-to-digital converter and/or a processor) through the differential output terminal pair of the differential amplifier 223 in step S810.

Based on the sensing signals with respect to the sensing electrodes of the first row ROW1 and the sensing electrodes of the second row ROW2, the next stage circuit may determine whether the sensor array 210 is heavily pressed (step S820). For instance, the next stage circuit (not shown) may determine whether each of the sensing signals with respect to the sensing electrodes of the first row ROW1 and the sensing electrodes of the second row ROW2 is greater than a threshold. The threshold may be set based on a design requirement. For instance, in step S820, whether a most significant bit (MSB) of each of the sensing signals with respect to the sensing electrodes of the first row ROW1 and the sensing electrodes of the second row ROW2 is greater than the threshold may be determined.

In response to the determination that the senor array is heavily pressed, the next stage circuit (not shown) may electrically disconnect a first number of reference sensing electrodes in the reference sensing electrode group (which includes, for example, the reference sensing electrode RS1, the reference sensing electrode RS2, the reference sensing electrode RS3 and the reference sensing electrode RS4 illustrated in FIG. 9) from corresponding charge amplifiers and electrically connect in parallel a second number of reference sensing electrodes in the reference sensing electrode group (step S830). For instance, if it is assumed that the next stage circuit (not shown) determines that among the sensing electrodes of the first row ROW1 and the sensing electrodes of the second row ROW2, a half amount of the sensing electrodes are greater than the threshold, in step S830, a half amount of the reference sensing electrodes in the reference sensing electrode group are electrically disconnected from the corresponding charge amplifiers, and the other half amount of the reference sensing electrodes in the reference sensing electrode group are electrically connected in parallel.

In step S840, the readout circuit 920 may receive/generate a reference voltage signal by using the reference sensing electrodes which are electrically connected in parallel in step S830. The readout circuit 920 may receive sensing result corresponding to all the sensing electrodes in the sensor array 210 by using the reference voltage signal. Thus, in step S840, the next stage circuit (not shown) may generate an image (e.g., a fingerprint image) by using the reference voltage signal received from the reference sensing electrodes connected in parallel.

In a condition that the finger touches the sensor array 210, if it is determined, in step S820, that the senor array 210 is not heavily pressed, the next stage circuit (not shown) may perform the first operation mode or the second operation mode as described in the embodiments above to sense the image (step S850).

The next stage circuit (not shown) may be implemented not only by a logic circuit (i.e., hardware) on an integrated circuit, but also by software through a central processing unit (CPU). In the latter case, related functions of the next stage circuit (not shown) may be implemented as programming codes of software (i.e., programs). For example, the next stage circuit (not shown) may be implemented by using general programming languages (e.g., C or C++) or other suitable programming languages. The aforementioned software (i.e., the programs) may be accessed by a computer (or the CPU) and recorded/stored in a read only memory (ROM), a storage device (or referred to as a recording medium) and/or a random access memory (RAM). Additionally, the programs may be accessed and executed from the recording medium through the computer (or the CPU) to accomplish the related functions. As for the recording medium, a non-transitory computer readable medium, such as a tape, a disk, a card, a semiconductor memory or a programming logic circuit, may be used. In addition, the programs may be provided to the computer (or the CPU) through any transmission medium (e.g., a communication network or radio waves). The communication network is, for example, the Internet, wired communication, wireless communication or other communication media.

In different application scenarios, related functions of the next stage circuit (not shown) may be implemented in a form of firmware or hardware by utilizing general programming languages (e.g., C or C++), hardware description languages (e.g., Verilog HDL or VHDL) or other suitable programming languages. In terms of the hardware implementation, one or more controllers, micro-controllers, Application-specific integrated circuits (ASICs), digital signal processors (DSPs), field programmable gate arrays (FPGAs) and/or other various logic blocks, modules and circuits in other processing units may be employed to implement or execute the aforementioned functions of the embodiments of the invention. Moreover, the device and the method of the invention may be implemented by a combination of hardware and software.

In light of the foregoing, two charge amplifiers with similar structure are used in the capacitive image sensing device and the capacitive image sensing method of the embodiments of the invention. The first charge amplifier is configured to receive a sensing result corresponding to one of the sensing electrodes in the sensor array and provide a sensing signal to the first input terminal of the differential amplifier. The second capacitor is configured to provide the reference voltage signal to the second input terminal of the second charge amplifier. With the symmetrical readout circuit structure, the capacitive image sensing device can compensate, eliminate or mitigate the interference from the power noise.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A capacitive image sensing device, comprising:
    a sensor array, comprising a plurality of sensing electrodes and a first reference sensing electrode;
    a first charge amplifier, having an input terminal coupled to one of the sensing electrodes;
    a second charge amplifier;
    a differential amplifier, having a first input terminal, a second input terminal and a differential output terminal pair, wherein the first input terminal of the differential amplifier is selectively coupled to an output terminal of the first charge amplifier, and the second input terminal of the differential amplifier is coupled to an output terminal of the second charge amplifier; and
    a first switching circuit, coupled between the first reference sensing electrode and an input terminal of the second charge amplifier, wherein the first switching circuit is configured to selectively electrically connect and disconnect the first reference sensing electrode and the input terminal of the second charge amplifier.

2. The capacitive image sensing device according to claim 1, wherein the first switching circuit electrically connects the first reference sensing electrode to the input terminal of the second charge amplifier in a first operation mode and electrically disconnects the first reference sensing electrode from the input terminal of the second charge amplifier in a second operation mode.

3. The capacitive image sensing device according to claim 1, wherein the first charge amplifier comprises:
    an operation amplifier, having an inverting input terminal, a non-inverting input terminal and an output terminal, wherein the inverting input terminal of the operation amplifier is coupled to the one of the sensing electrodes of the sensor array, the non-inverting input terminal of the operation amplifier is coupled to a reference signal, and the output terminal of the operation amplifier is coupled to the first input terminal of the differential amplifier;
    a feedback capacitor, coupled between the inverting input terminal of the operation amplifier and the output terminal of the operation amplifier; and
    a reset switch, coupled between the inverting input terminal of the operation amplifier and the output terminal of the operation amplifier.

4. The capacitive image sensing device according to claim 1, wherein the second charge amplifier comprises:
    an operation amplifier, having an inverting input terminal, a non-inverting input terminal and an output terminal, wherein the inverting input terminal of the operation amplifier is coupled to the first switching circuit, the non-inverting input terminal of the operation amplifier is coupled to a reference signal, and the output terminal of the operation amplifier is coupled to the second input terminal of the differential amplifier;
    a feedback capacitor, coupled between the inverting input terminal of the operation amplifier and the output terminal of the operation amplifier; and
    a reset switch, coupled between the inverting input terminal of the operation amplifier and the output terminal of the operation amplifier.

5. The capacitive image sensing device according to claim 1, wherein the sensor array further comprises a second reference sensing electrode, and the capacitive image sensing device further comprises:
    a third charge amplifier, having an input terminal coupled to the first switching circuit and an output terminal coupled to the second input terminal of the differential amplifier,
    wherein the first switching circuit is configured to selectively electrically connect and disconnect the second reference sensing electrode and the input terminal of the third charge amplifier.

6. The capacitive image sensing device according to claim 5, wherein the first reference sensing electrode and the second reference sensing electrode are located in a central region of the sensor array.

7. The capacitive image sensing device according to claim 5, wherein the first switching circuit electrically connects the second reference sensing electrode to the input terminal of the third charge amplifier in a first operation mode and electrically disconnects the second reference sensing electrode from the input terminal of the third charge amplifier in a second operation mode.

8. The capacitive image sensing device according to claim 5, further comprising:
    a second switching circuit, configured to selectively electrically connect and disconnect the input terminal of the second charge amplifier and the input terminal of the third charge amplifier and selectively electrically connect in parallel and disconnect a feedback capacitor of the second charge amplifier and a feedback capacitor of the third charge amplifier.

9. The capacitive image sensing device according to claim 8, wherein
    the second switching circuit electrically connects the input terminal of the second charge amplifier to the input terminal of the third charge amplifier and electrically connects in parallel the feedback capacitor of the second charge amplifier and the feedback capacitor of the third charge amplifier in a first operation mode, and
    the second switching circuit electrically disconnects the input terminal of the second charge amplifier from the input terminal of the third charge amplifier and electrically disconnects the feedback capacitor of the second charge amplifier from the feedback capacitor of the third charge amplifier in a second operation mode.

10. The capacitive image sensing device according to claim 9, wherein the first switching circuit electrically connects the first reference sensing electrode to the input terminal of the second charge amplifier and electrically disconnects the second reference sensing electrode from the input terminal of the third charge amplifier in the first operation mode.

11. The capacitive image sensing device according to claim 9, wherein only one of the second charge amplifier and the third charge amplifier is enabled in the first operation mode.

12. A capacitive image sensing method for sensing an image by a sensor array, the sensor array comprising a plurality of sensing electrodes and a reference sensing electrode group located in a central region of the sensor array, the capacitive image sensing method comprising:
- receiving a plurality of sensing signals with respect to a first row of sensing electrodes and a second row of sensing electrodes, wherein the first row of sensing electrodes and the second row of sensing electrodes are parts of the plurality of sensing electrodes and are located adjacent to the reference sensing electrode group;
- determining whether the sensor array is heavily pressed based on the sensing signals;
- electrically disconnecting a first number of reference sensing electrodes in the reference sensing electrode group from corresponding charge amplifiers, and electrically connecting in parallel a second number of reference sensing electrodes in the reference sensing electrode group in response to the determination that the sensor array is heavily pressed; and
- generating an image by using a reference voltage signal received from the reference sensing electrodes connected in parallel.

\* \* \* \* \*